US 6,571,145 B1

(12) United States Patent
Matsumiya et al.

(10) Patent No.: US 6,571,145 B1
(45) Date of Patent: May 27, 2003

(54) MANUFACTURING SYSTEM AND METHOD

(75) Inventors: Sadayuki Matsumiya, Kanagawa (JP); Yukio Mawake, Tochigi (JP); Yukio Yatabe, Tochigi (JP)

(73) Assignees: Mitutoyo Corporation, Kawasaki (JP); Globus Technical Equipment, Ltd., Tel-Aviv (IL)

( * ) Notice: Subject to any disclaimer, the term of this patent is extended or adjusted under 35 U.S.C. 154(b) by 0 days.

(21) Appl. No.: 09/558,061

(22) Filed: Apr. 26, 2000

(30) Foreign Application Priority Data

Apr. 28, 1999 (JP) ............................................. 11-122435

(51) Int. Cl.[7] .............................................. G06F 19/00
(52) U.S. Cl. ......................... 700/95; 700/175; 700/169
(58) Field of Search ............................... 700/108, 109, 700/110, 117, 173, 174, 176, 178, 169, 175; 702/84, 182

(56) References Cited

U.S. PATENT DOCUMENTS

| | | | | |
|---|---|---|---|---|
| 5,262,954 A | * | 11/1993 | Fujino et al. ............... | 700/112 |
| 5,291,416 A | * | 3/1994 | Hutchins ..................... | 700/174 |
| 5,339,249 A | | 8/1994 | Schaeffer .................... | 700/169 |
| 5,473,532 A | * | 12/1995 | Unno et al. .................. | 700/254 |
| 5,993,043 A | * | 11/1999 | Fujii .......................... | 700/120 |
| 6,101,456 A | * | 8/2000 | Kowatari et al. ............. | 700/28 |

FOREIGN PATENT DOCUMENTS

| | | |
|---|---|---|
| JP | 63-250703 | 10/1988 |
| JP | 3-176703 | 7/1991 |
| JP | 3-202252 | 9/1991 |
| JP | 4-482 | 1/1992 |
| JP | 5-224715 | 9/1993 |
| JP | 7-93017 | 4/1995 |

* cited by examiner

*Primary Examiner*—Leo Picard
*Assistant Examiner*—Kidest Bahta
(74) *Attorney, Agent, or Firm*—Oliff & Berridge, PLC

(57) ABSTRACT

A manufacturing system of the present invention comprises NC machine tools $2_1-2_n$ each for processing a work in accordance with a process program having a process condition; a measuring device 3 for measuring the work processed by the NC machine tools $2_1-2_n$; and computers 5, $8_1-8_n$ for modifying the process condition of the process program on the basis of a measured result from the measuring device 3. The computer 5 produces a correction data file for modifying the process condition on the basis of the measured result from the measuring device 3. The correction data file is a file that contains correction values for each of processed parts stored in variables capable of being referred directly or indirectly from the process program. The correction data file is transferred to the NC controllers $9_1-9_n$ prior to the NC machine tools $2_1-2_n$ processing the work. The NC controllers $9_1-9_n$ modify the process condition by the process program with reference to the correction values stored in the variables of the transferred correction data file.

12 Claims, 11 Drawing Sheets

FIG. 4

| | | | | | |
|---|---|---|---|---|---|
| 1 Mode-change | | Noms:Signed | | | |
| 2 Print-format | | Tol.Comparisons Only | | & TP | |
| 3 New heading lines | | 8701 | 8701 | | |
| 4 DP Probe Data, Load from Disc | | | | | |
| 5 Change probe | | 1 | | | |
| 6 Projection ON / OFF XY-Plane | | | | | |
| 7 PLANE plane | | M= | 1P= 3 | | |
| 8 CS Plane Alignment | | | XY-Plane | | |
| 14 CNC ON | | | | | |
| 15 CNC Values | | 200mm/s  3mm/s | 3.000mm  0.500mm | 30.000 | |
| 16 IP | -5.000 | 33.000 | 10.000 | | |
| 17 PLANE | | M= | 1P= 4 | | |
| 18 PO | 45.000 | 8.000 | 0.000 | 90:00:00  90:00:00  180:00:00 | |
| 38 CS Create Origin Point | | | To last Measured X-Coordinate | | |
| 39 CS Store Coordinate Sysytem | | | 10 | | |
| 40 IP | -5.000 | 33.000 | 10.000 | | |
| 41 IP | 95.000 | 33.000 | 10.000 | | |
| 42 SIDE | | M= | 4P= 1 | | |
| 43 PO | 90.000 | 33.000 | -9.000 | 180:00:00  90:00:00  90:00:00 | |
| 44 Element Finished | | | | | |
| 45 Text to printer | | DIM 1 | | | |
| 46 TO Pos.X | | 90,000 | 0.030  -0.030 | | |
| 47 IP | 95.000 | 33.000 | 10.000 | | |
| 48 IP | 0.000 | 33.000 | 10.000 | | |
| 49 SIDE | | M= | 5P= 1 | | |
| 50 PO | 5.000 | 33.000 | -4.500 | 0:00:00  90:00:00  90:00:00 | |
| 51 Element Finished | | | | | |
| 52 Text to printer | | DIM 5 | | | |
| 53 TO Pos.X | | 5,000 | 0.050  -0.050 | | |
| 54 CS Create Origin Point | | | To last Measured X-Coordinate | | |
| 55 IP | 0.000 | 33.000 | 10.000 | | |
| 56 SIDE | | M= | 16P= 1 | | |
| 57 IP | 85.000 | 33.000 | 10.000 | | |
| 58 IP | 85.000 | 33.000 | -4.500 | | |
| 59 PO | 80.000 | 33.000 | -4.500 | 180:00:00  90:00:00  90:00:00 | |
| 60 Element Finished | | | | | |
| 159 CS Recall Coordinate Sysytem | | | 10 | | |
| 160 IP | 110.000 | 33.000 | -19.000 | | |
| 161 IP | 110.000 | 33.000 | 200.000 | | |
| 162 Change probe | | 1 | | | |
| 163 IP | 0.000 | 250.000 | 300.000 | | |

FIG. 5

| Tolerance Ref | Nominal | Up/Lo Tol | Actual | Dev/Error | |
|---|---|---|---|---|---|
| **  DIM 3 ** | | | | | |
| 5 N0049 Distance | 60.000 | 0.030<br>-0.030 | 60.049 | 0.049<br>0.019 | ----+---->> |
| ** DIM 2 ** | | | | | |
| 6 N0062 Distance | 10.000 | 0.050<br>-0.050 | 10.005 | 0.005 | ----**---- |
| ** DIM 1 ** | | | | | |
| 6 N0064 Distance | 90.000 | 0.030<br>-0.030 | 90.036 | 0.036<br>0.006 | ----+---->> |
| ** DIM 5 ** | | | | | |
| 6 N0066 Distance | 5.000 | 0.050<br>-0.050 | 4.987 | -0.013 | ----**---- |
| ** DIM 7 ** | | | | | |
| 8 N0084 Distance | 6.000 | 0.030<br>-0.030 | 5.987 | -0.013 | -----*----- |

FIG. 6

| SERIAL | STATUS | DIM | DATE | NOMINAL | TOL+ | TOL- | ACT | DEV | ERR | OPERATOR | FMS | MACHINE |
|---|---|---|---|---|---|---|---|---|---|---|---|---|
| 90 | *!!!* | DIM 1 | 04/03/99 | 90 | 0.03 | -0.03 | 90.036 | 0.036 | 0.006 | | 1 | * |
| 90 | | DIM 5 | 04/03/99 | 5 | 0.05 | -0.05 | 4.987 | -0.013 | 0 | | 1 | * |
| 90 | *!!!* | DIM 6 | 04/03/99 | 80 | 0.03 | -0.03 | 80.055 | 0.055 | 0.025 | | 1 | * |
| 90 | | DIM 2 | 04/03/99 | 10 | 0.05 | -0.05 | 10.005 | 0.005 | 0 | | 1 | * |
| 90 | *!!!* | DIM 3 | 04/03/99 | 60 | 0.03 | -0.03 | 60.049 | 0.049 | 0.019 | | 1 | * |
| 90 | | DIM 4 | 04/03/99 | 3 | 0.03 | -0.03 | 2.983 | -0.017 | 0 | | 1 | * |
| 90 | | DIM 7 | 04/03/99 | 6 | 0.03 | -0.03 | 5.987 | -0.013 | 0 | | 1 | * |
| 90 | *!!!* | DIM 10 | 04/03/99 | 13 | 0.015 | -0.015 | 12.978 | -0.022 | -0.007 | | 1 | |
| 90 | | DIM 8 | 04/03/99 | 45 | 0.1 | -0.1 | 45.017 | 0.017 | 0 | | 1 | |
| 90 | | DIM 9 | 04/03/99 | 33 | 0.1 | -0.1 | 33.017 | 0.017 | 0 | | 1 | * |
| 90 | | DIM 11 | 04/03/99 | 8 | 0.01 | -0.01 | 7.99 | -0.01 | 0 | | 1 | * |
| 90 | *!!!* | DIM 12 | 04/03/99 | 25 | 0.03 | -0.03 | 24.967 | -0.033 | -0.003 | | 1 | * |
| 90 | | DIM 13 | 04/03/99 | 12 | 0.03 | -0.03 | 11.981 | -0.019 | 0 | | 1 | * |
| 90 | *!!!* | DIM 14 | 04/03/99 | 25 | 0.03 | -0.03 | 24.958 | -0.042 | -0.012 | | 1 | * |
| 90 | | DIM 15 | 04/03/99 | 12 | 0.03 | -0.03 | 11.978 | -0.022 | 0 | | 1 | * |

FIG. 8

```
_&HE:_%
O8701
#801=-0.036(DIM#-1)
#802= 0.000(DIM#-2)
#803= 0.049(DIM#-3)
#804=-0.000(DIM#-&4)
#805= 0.013(DIM#-5)
#806=-0.055(DIM#-6)
#807=-0.011(DIM#-&7)
#808= 0.000(DIM#-8)
#809= 0.000(DIM#-9)
#810=-0.022(DIM#-&10)
#811=-0.000(DIM#-&11)
#812=-0.042(DIM#-&12)
#813=-0.000(DIM#-&13)
#814= 0.031(DIM#-14)
#815=-0.000(DIM#-&15)
M99
%_
```

FIG. 9

| | |
|---|---|
| 1 | O8701 |
| 2 | #798=0 |
| 3 | M198P8701 |
| 4 | M98P8058 |
| 5 | G10L2P1X-445.0Y-426.689Z-598.0 |
| 6 | G10L2P2X-702.0Y-426.689Z-855.0 |
| 7 | G10L2P3X-98.0Y-426.689Z-855.0 |
| 8 | G91G30G00X0.0Y0.0Z0.0 |
| 9 | T56 |
| 10 | M06 |
| 11 | T54 |
| 12 | N160 |
| 13 | G90B270.0 |
| 14 | #700=160 |
| 15 | M98P8702 |
| 16 | G54.1 |
| 17 | #777=#2401 |
| 18 | #2401=#2401+#799 |
| 19 | G00X0.0Y-15.0 |
| 20 | G43Z100.0H1 |
| 21 | M03 |
| | ⋮ |
| | ⋮ (TOOL TRACE) |
| | ⋮ |
| 22 | M05 |
| 23 | #2401=#777 |
| 24 | G91G30G00X0.0Y0.0Z0.0 |
| 25 | N210 |
| 26 | G90B270.0 |
| 27 | #700=210 |
| 28 | M98P8702 |
| 29 | G54.1 |
| 30 | #777=#2401 |
| 31 | #2401=#2401+#799 |
| 32 | G00X45.Y33. |
| 33 | G43Z100.0H1 |
| | ⋮ |
| | ⋮ |

FIG. 10

```
1   O8058
2   IF[#798EQ0]GOTO100
3   #3000=#798(CORRECTION VALUE TOO LARGE)
4   N100 M99
```

FIG. 11

```
1   O8702
2   GOTO#700

3   N160
4   G65P8254X#802Y0.0Z#804
5   #799=#803/2
6   GOTO100

7   N210
8   G65P8254X#808Y#809Z#811
9   #799=#810
10  GOTO100

11  N230
12  G65P8256X#812Y0.0Z0.0
13  #799=#813/2
14  GOTO100

MANUFACTURING SYSTEM AND METHOD

BACKGROUND OF THE INVENTION

1. Field of the Invention

The present invention relates to a manufacturing system and apparatus capable of performing a high-precision processing by measuring a work processed by a NC machine tool; determining a processed error from the measured value obtained; and feeding a correction value produced on the basis of the processed error back to the NC machine tool.

2. Description of the Related Art

A manufacturing system of feedback type has been known in the art, which measures a processed part on a work in a process line for determining its processed error and alters a process condition for a NC machine tool based on the processed error (for example, JP 5-224715A). Such the manufacturing system of feedback type is directed to substantially alter the process condition on the basis of a dimensional processed error at the processed part and information of its variation trend obtained during or after processing. Therefore, it is advantageously capable of improving and maintaining a process precision for a component by feeding back a measured result in real time.

Methods of correcting the process condition in such the system have been proposed, which include a method of producing a re-process program for modification processing (for example, JP 3-176703A) and a method of correcting a correction value described in a process program (for example, JP 3-202252A).

The above-described conventional process systems are, however, all designed to add a certain process condition alteration to the process program for controlling the NC machine tool. Therefore, they have difficulties in processing to alter the process program and in controlling timings for alteration disadvantageously. In particular, modifications of process conditions for a plurality of NC machine tools require an independent modification of the process condition every machine tool. This causes a problem to complicate an algorithm for modifying the process conditions.

SUMMARY OF THE INVENTION

The present invention has been made in consideration of the above situation. The present invention accordingly has an object to provide a manufacturing system and method capable of smoothly modifying a process condition for a NC machine tool in such a manufacturing system that modifies the process condition thorough a feedback of a processed result by the NC machine tool.

The present invention is provided with a manufacturing system, which comprises a NC machine tool for processing a work in accordance with a process program having a process condition. It also comprises a measuring device for measuring the work processed by the NC machine tool, and a process condition correcting means for modifying the process condition of the process program on the basis of a measured result from the measuring device. The process condition modifying means includes a correction data file producing means for producing a correction data file to modify the process condition on the basis of the measured result from the measuring device. The correction data file has variables capable of being referred directly or indirectly from the process program. The variables each store a correction value for each processed part. The process condition modifying means also includes a correction data file storage means for storing the correction data file produced at the correction data file producing means. The process condition modifying means further includes a correction data file transferring means for transferring the correction data file stored in the correction data file storage means to the NC machine tool prior to the NC machine tool processing the work. The NC machine tool modifies the process condition with reference to the correction values stored in the variables in the transferred correction data file in accordance with the process program.

The present invention is also provided with a manufacturing method, which comprises the step of NC-processing a work by a NC machine tool operable in accordance with a process program having a process condition. It also comprises the steps of measuring the work processed in the step of NC-processing, and of modifying the process condition of the process program on the basis of a measured result obtained from the step of measuring.

The step of correcting the process condition includes the step of producing a correction data file to modify the process condition on the basis of the measured result. The correction data file has variables capable of being referred directly or indirectly from the process program. The variables each store a correction value for each processed value. The step of correcting the process condition also includes the step of storing the correction data file produced in the step of producing. It further includes the steps of transferring the correction data file stored at the step of storing to the NC machine tool prior to the NC-processing, and of modifying the process condition contained in the process program by referring the transferred correction data file in the process program.

According to the present invention, the correction data file is produced on the basis of the measured result. The correction data file is then transferred to the NC machine tool. The process program in the NC machine tool alters the process condition with reference to the correction data file. Therefore, the process program itself has no need to be altered. In addition, reference to the correction data file is performed in the process program in the NC machine tool. Therefore, it is sufficient to transfer the correction data file to the NC machine tool previously or to put it in a readable state from the NC machine tool. Thus, the production of the process program can be very easily achieved as well as the transferring control for the correction data.

A timing of reading the correction data file in the NC machine tool can be controlled by, for example, describing an instruction for reading the correction data file in the process program for the NC machine tool followed by decision and process instructions of the process condition. The correction data file transferring means may also output an acceptance request for the correction data file to the NC machine tool. In this case, it transfers the correction data file to the NC machine tool after receiving an acceptance message from the NC machine tool. The former is particularly suitable for an off-line process system and the latter particularly for an in-line process system.

The process program for the NC machine tool may include a process main program and a correction macro program. The process main program comprises the steps of reading in the correction data file and reading out the correction macro program on decision of the process condition per each processed part. The correction macro program comprises the step of computing a correction value for the process condition on the basis of the read in correction data file and storing the correction value into a variable capable of being referred from the process main program.

The correction data file producing means may act a predetermined range from a limit value of a design tolerance for each processed part as a correction range. It may store an error component relative to a nominal as a correction value in the correction data file if the measured result from the measuring device is contained within the correction range.

The correction data file producing means may store a value for activating an abnormal process in an alarm variable capable of being referred from the process program and may describe the alarm variable in the correction data file if an error between the measured result from the measuring device and a nominal is equal to a predetermined multiple of a designated tolerance. The NC machine tool may execute a predetermined abnormal process if the value for activating an abnormal process is stored in the alarm variable described in the correction data file.

BRIEF DESCRIPTION OF THE DRAWINGS

The present invention will be more fully understood from the following detailed description with reference to the accompanying drawings in which:

FIG. 4 is a diagram showing a measurement part program in the system;

FIG. 5 is a diagram showing an intermediate file for measured results produced in the system;

FIG. 6 shows a report file produced on the basis of the intermediate file;

FIG. 8 is a diagram illustrating a correction data file produced in the system;

FIG. 9 is a diagram showing a process main program in the system;

FIG. 10 is a diagram showing an alarm message macro program read out from the process main program;

FIG. 11 is a diagram showing a macro program for correcting computation of coordinates and tool diameters read out from the process main program;

FIG. 12 is a diagram showing a macro program for correcting coordinates system read out from the macro program for correcting computation of coordinates and tool diameters;

FIG. 13 is a diagram showing another macro program for correcting coordinates system read out from the macro program for correcting computation of coordinates and tool diameters.

DETAILED DESCRIPTION OF THE PREFERRED EMBODIMENTS

Figure 1:
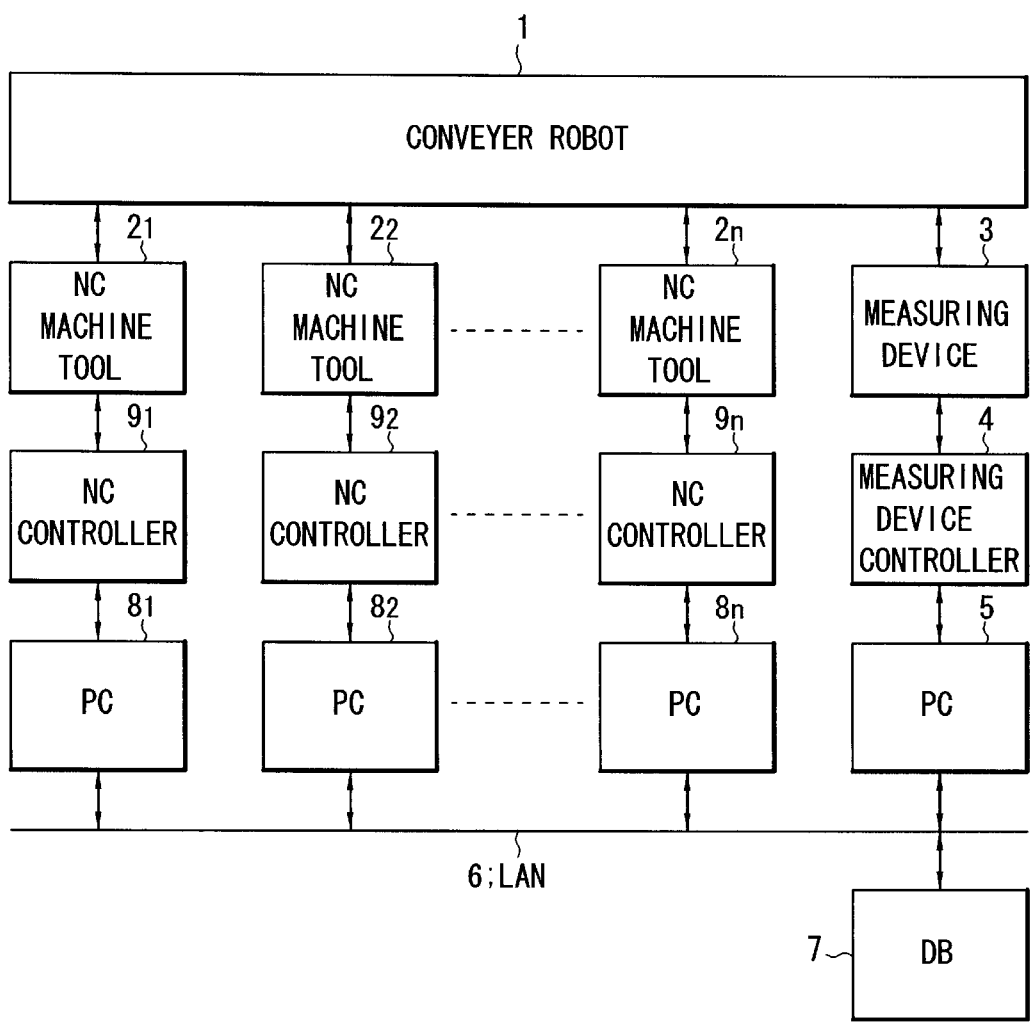
FIG. 1 is a block diagram showing an in-line full automatic manufacturing system according to an embodiment of the present invention.

Referring now to the drawings, preferred embodiments of the present invention will be described below.

FIG. 1 shows an embodiment of an in-line full automatic system to which a manufacturing system according to the present invention is applied.

Works to be processed are conveyed along a conveyer line in a conveyer robot 1 and processed through a plurality of NC machine tools $2_1, 2_2, \ldots 2_n$ arrayed along the conveyer line. The NC machine tools $2_1$–$2_n$ are respectively assigned to process identical parts of the works. They include machining centers, lathes, milling cutters, gliding centers and stamping machine tools. These NC machine tools $2_1$–$2_n$ are numerically controlled by NC controllers $9_1$–$9_n$ based on a process part program. The processed works are subjected to a measuring device 3, which is arranged downstream from the NC machine tools $2_1$–$2_n$ in the direction of conveyance, where each processed part is measured. The measuring device 3 includes a three-dimensional measuring device, a surface roughness tester, calipers, a micrometer, a contour measuring instrument, a roundness measuring machine and a dial gauge.

A measured result from the measuring device 3 is fed into a first computer 5 through a measuring device controller 4 that controls the measuring device 3. The computer 5 comprises a correction data file producing means and produces a correction data file based on a measured value from the measuring device 3. The correction data file is stored in a database 7 serving as a correction data file storage means through a LAN (Local Area Network) 6. The computer 5 also serves as a correction data file transferring means. It transfers the correction data file stored in the database 7 at a given timing through the LAN 6 to a plurality of second computers $8_1, 8_2, \ldots 8_n$ that are arranged respectively corresponding to the NC machine tools $2_1$–$2_n$. The second computers $8_1$–$8_n$ rewrite a newly transferred correction data file on the correction data file associated with the process part program used in the NC controllers $9_1, 9_2, \ldots 9_n$ that respectively numerically control the NC machine tools $2_1$–$2_n$.

Operation will be described next with respect to thus configured manufacturing system of this embodiment.

Figure 2:
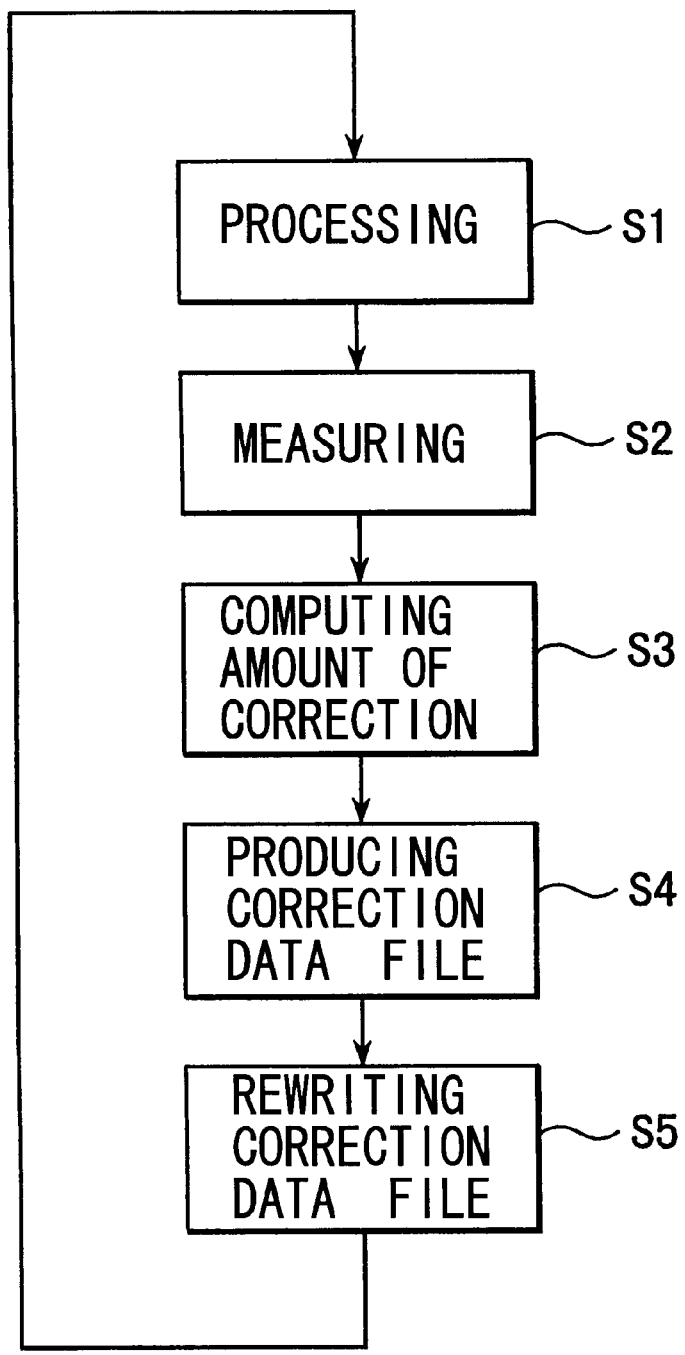
FIG. 2 is a flowchart showing an operation of the system.
Figure 3:
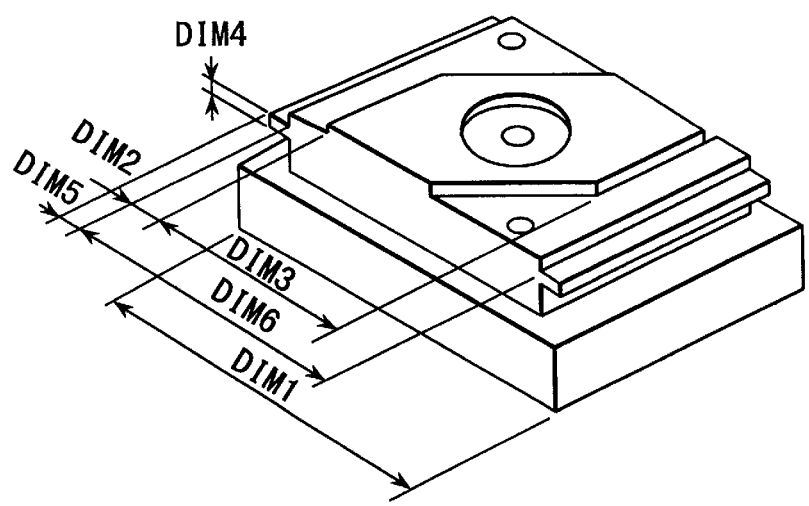
FIG. 3 is a perspective view illustrating a work processed in the system and measurement parts thereof.

FIG. 2 is a flowchart showing a flow of the operation of this manufacturing system. First, processing by the NC machine tools $2_1$–$2_n$ is performed (S1). Then, the processed works are conveyed by the conveyer robot 1 to the measuring device 3, where each processed part is measured (S2). Measurement items include a hole diameter, a hole position, a width, a height, a depth, an angle, a length and a surface roughness. FIG. 3 is a perspective view showing an example of a work. DIM1–6 in this case are exemplified as measurement parts. The measuring device controller 4 measures these measurement parts and computes their amounts of corrections, and produces an intermediate file for indicating measured results of the measurement parts (S3).

FIG. 4 shows a measurement part program that is executed by the measuring device controller 4 for controlling the measuring device 3. In this case, there are particularly declarations: on the 1st line to input and output data in a signed mode; on the 2nd line to only print a result of tolerance comparison as a print format; and on the 3rd line to print "8701" for a NC program number. An instruction, "Text to printer DIM 1", described on the 45th line instructs to print out a measured value regarding DIM 1. The subsequent instruction, "To Pos.X 90,000 0.030-0.030", instructs to perform the tolerance comparison. The 52nd and 53rd lines also have the same instructions as above. These instructions are described with respect to all measurement parts to produce an intermediate file for indicating measured results of all measurement parts at the end of the measurement operation as shown in FIG. 5. The intermediate file describes a designed value (Nominal), a dimensional tolerance (Up/Lo Tol), an actually measured value (Actual), an error between the designed value and the measured value (Error) and a deviation from the tolerance (Dev), and finally trends inside and outside the tolerance, with respect to each processed part. FIG. 6 shows a report file produced inside the computer 5 on the basis of the intermediate file. The last mark "*" indicates that a correction was performed.

Figure 7:
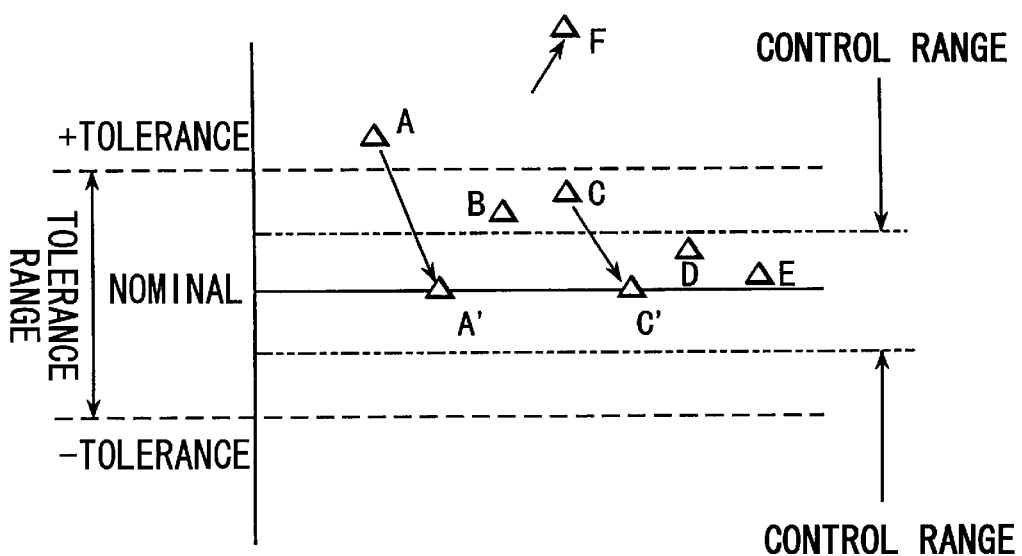
FIG. 7 is a diagram illustrating control limits for the process condition in the system.

The need for correcting the process condition can be determined as follows. Namely, if a process dimension is contained within the tolerance range, the process condition is not necessary to be corrected theoretically. Though, even though the process dimension is contained within the tolerance range, if it is extremely close to the edge of the tolerance range, the process dimension has a high probability to fall outside the tolerance range. Then, setting limits necessary to control the process condition by allowing certain margins originated from the edges of the dimensional tolerance toward the designed value (nominal) as shown in FIG. 7. If the measured results are contained within the control ranges as in the cases of A and C, it is required to correct the process conditions so that they come to A'and C'. If the measured results are contained within 50% the dimensional tolerance as in the cases of D and E, it is not required to correct the process conditions. In this example, 50% the dimensional tolerance is determined as the control limits. To eliminate affections from noises and others, the measured result is not corrected immediately even if it is contained within the control ranges. Rather, the measured results may be corrected only if they are successively contained within the control ranges by the predetermined number (2 in this case) as shown with B and C. If a measured result obtained exceeds a predetermined multiple of the tolerance, for example, 5 times the tolerance as shown with F, an abnormal process such as an alarm process may be executed.

After computing the amount of correction and producing the intermediate file, producing a correction data file based on the intermediate file (S4). FIG. 8 shows an example of the correction data file. #801–#815 denote variables for storing correction values on processed parts DIM1–DIM15. These variables #801–#815 can be referred from the process program as will be described later. The symbol "&" indicates that the sign is to be inverted. The first and last lines indicate protocols for transferring, the second line indicates the name of the corresponding NC program, and the last but one line indicates the ending comment of the sub program. If such an abnormal value as to require the alarm process is contained in the measured value, storing "1" into the alarm variable #798 to contain it in the correction data file. The correction data file is temporarily stored in the database 7.

Next, rewriting the correction data file (S5). It is essential to rewrite the correction data file during other time periods than the NC machine tools $2_1$–$2_n$ are working. This is effective to prevent the process conditions from varying during the process operations. The computer 5 therefore sends out acceptance requests for correction data file to the computers $8_1$–$8_n$ and then transfers the correction data file reads out from the database 7 to only those that returned acceptable messages among the computers $8_1$–$8_n$. The operations of the NC machine tools $2_1$–$2_n$ may be presumably shifted from each other. Accordingly, timings to transfer the correction data file to the computers $8_1$–$8_n$ are not always coincident.

FIG. 9 shows a process main program stored in the NC controllers $9_1$–$9_n$. In this figure, dashed lines surround new additional portions in the present invention.

First, declaring that the program name is "O8701" (1), and then resetting a variable #798 that indicates the alarm to beep or not (2). Next, reading a correction data file named 8701 out of an external device (the computers $8_1$–$8_n$ in this case) (3). Invoking an alarm message program "O8058" (4). This alarm message program (O8058) is configured as shown in FIG. 10, for example. If #798 is equal to "0", then going to N100 and finishing with no operation (2). If #798≠0, then outputting a comment statement, "CORRECTION VALUE TOO LARGE", on the NC screen and halting the machine (3).

Next, in the process main program, setting work coordinates systems 1–3 (5–7). Determining a moving control for tools to an incremental command, and returning to the second reference point (the position to exchange the tool) (8). Invoking a tool and exchanging the tool (9–11).

Then, a sequence No.160 is begun (12). Determining the moving control for tools to an absolute command, and executing a B-axis command (13). Subsequently, saving "160" as a sequence number in a common variable #700 (14), and invoking a macro, "O8702", for computing coordinates/tool-diameter corrections (15). After a correction value was computed by this macro, setting a new corrected work coordinates system (16). Then, saving an initial value of the tool diameter, #2401, into a common variable #777 (17), and correcting the tool diameter #2401 with a tool diameter error #799 (18). Next, after fast forwarding and positioning (19), correcting a tool length with a tool length value H1 (20). Thus, corrections for the coordinates system, tool diameter and tool length are completed. Other process conditions to be altered include tool revolutions and forwarding speeds, which may affect to the surface roughness.

Subsequently, outputting a normal rotation command for the main axis (21), then controlling the tool to move in accordance with an instruction of the tool trace in order to execute the processing. After finishing the processing, outputting a halt command for the main axis (22) and returning the value saved in the common variable #777 to a tool #2401 (23). Determining the moving control for tools to an incremental command, and returning to the second reference point (the position to exchange the tool)(24). Thereafter, the same processing is performed with respect to a sequence No. 210 (25-).

FIG. 11 shows an example of the macro program, "O8702", for computing coordinates/tool-diameter corrections. First, jumping to a sequence with a sequence number saved in a common variable #700 (2). In this case, examples of sequences with numbers 160, 210 and 230 are described. If the sequence No. 160 (3) was executed, invoking the macro program, "O8254", for computing coordinates correction (4), and storing variables #802, #804 and #803/2 as an X-axis correction value, a Z-axis correction value and a tool diameter error #799, respectively. The macro program "O8254" is configured as shown in FIG. 12 to perform necessary corrections for X, Y and Z axes, for example. #7001, #7002 and #7003 denote variables to which corrected offset amounts on the first, second and third axes of the point of origin of a work are stored, respectively. #5221, #5222 and #5223 denote variables to which non-corrected offset amounts on the first, second and third axes of the point of origin of the work are stored, respectively. #24, #25 and #26 denote intra-macro variables to indicate X, Y and Z, respectively. In this case, the values of #802, 0.0 and the value of #804 are stored in #24, #25 and #26, respectively, thereby correcting the coordinates system. The variable #803 is divided by 2 in order to designate a tool radius using the tool diameter. A macro program "O8256", which is referred next in the macro program "O8702" for correction computing, also has the almost same configuration like the above as shown in FIG. 13.

Through the execution of the above process program, it is possible to update the process condition by transferring the correction data file at an appropriate timing and updating it without altering the process program itself.

Figure 14:
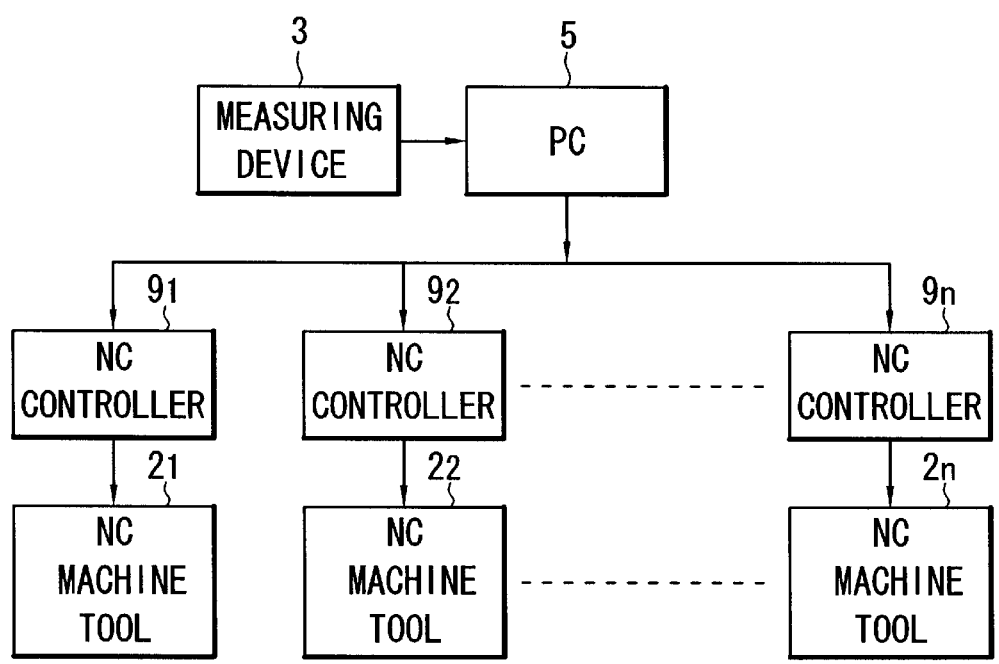
FIG. 14 is a diagram showing an arrangement of an off-line manufacturing system according to another embodiment of the present invention.

Although the online manufacturing system is exemplified above, the present invention can also be applied to an off-line manufacturing system. In this case, as shown in FIG. 14, a worker carries the works processed by the NC machine tools 21–2n to the measuring device 3, where the works are measured. Then, the computer 5 produces the correction data file based on the measured results and the NC controller 91–9n read in the correction data file appropriately.

As described above, according to the present invention, the correction data file is produced on the basis of the measured result. The correction data file is then transferred to the NC machine tool. The process program in the NC machine toll alters the process condition with reference to the correction data file. Therefore, the process program itself has no need to be altered. In addition, reference to the correction data file is performed in the process program in the NC machine tool. Therefore, it is sufficient to transfer the correction data file to the NC machine tool previously or to put it in a readable sate from the NC machine tool. Thus, the production of the process program can be very easily achieved as well as the transferring control for the correction data.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A manufacturing system, comprising:
   a NC machine tool for processing a work in accordance with a process program having variables to refer a process condition;
   a measuring device for measuring said work processed by said NC machine tool; and
   a process condition modifying means for modifying said process condition referred from said variables of said process program on the basis of a measured result from said measuring device,
   said process condition modifying means including:
      a correction data file producing means for producing a correction data file to modify said process condition on the basis of said measured result from said measuring device, said correction data file having correction values to be referred to said variables of said process program;
      a correction data file storage means for storing said correction data file produced at said correction data file producing means; and
      a correction data file transferring means for transferring said correction data file stored in said correction data file storage means to said NC machine tool prior to said NC machine tool processing said work, and
   said NC machine tool modifying said process condition through said variables in said process program with reference to said correction values stored in said transferred correction data file in accordance with said process program.

2. The manufacturing system according to claim 1, wherein said process program for said NC machine tool contains an instruction for reading said correction data file described therein followed by decision and process instructions of said process condition.

3. The manufacturing system according to claim 1, wherein said correction data file transferring means outputs an acceptance request for said correction data file to said NC machine tool and, after receiving an acceptable message from said NC machine tool, transfers said correction data file to said NC machine tool.

4. The manufacturing system according to claim 1, wherein said process program for said NC machine tool includes a process main program and a correction macro program,
   said process main program comprising the steps of:
      reading in said correction data file; and
      reading out said correction macro program on decision of said process condition per each processed part, and
   said correction macro program comprising the step of computing a correction value for said process condition on the basis of said read in correction data file and storing said correction value into a variable capable of being referred from said process main program.

5. The manufacturing system according to claim 1, wherein said correction data file producing means sets a predetermined range from a limit value of a design tolerance for each processed part as a correction range and, if said measured result from said measuring device is contained within said correction range, stores an error component relative to a nominal in said correction data file as a correction value.

6. The manufacturing system according to claim 1, wherein, if an error between said measured result from said measuring device and a nominal is equal to a predetermined multiple of a designated tolerance, said correction data file producing means stores a value for activating an abnormal process in an alarm variable capable of being referred from said process program and describes said alarm variable in said correction data file, and
   if said value for activating an abnormal process is stored in said alarm variable described in said correction data file, said NC machine tool executes a predetermined abnormal process.

7. A manufacturing method, comprising the steps of:
   NC-processing a work by a NC machine tool operable in accordance with a process program having variables to refer a process condition;
   measuring said work processed in said step of NC-processing; and
   modifying said process condition of said process program on the basis of a measured result obtained from said step of measuring,
   said step of modifying said process condition including the steps of:
      producing a correction data file to modify said process condition on the basis of said measured result, said correction data file having correction values to be referred to said variables of said process program;
      storing said correction data file produced in said step of producing;
      transferring said correction data file stored at said step of storing to said NC machine tool prior to said NC-processing; and
      modifying said process condition through said variables contained in said process program by referring said correction values stored in said transferred correction data file in accordance with said process program.

8. The manufacturing method according to claim 7, wherein said process program contains an instruction for reading said correction data file described therein followed by decision and process instructions of said process condition.

9. The manufacturing method according to claim 7, wherein said step of transferring said correction data file comprising the step of outputting an acceptance request for said correction data file to said NC machine tool and, after receiving an acceptable message from said NC machine tool, transferring said correction data file to said NC machine tool.

10. The manufacturing method according to claim 7, wherein said process program for said NC machine tool includes a process main program and a correction macro program, said process main program comprising the steps of:
  reading in said correction data file; and
  reading out said correction macro program on decision of said process condition per each processed part, and said correction macro program comprising the step of computing a correction value for said process condition on the basis of said read in correction data file and storing said correction value into a variable capable of being referred from said process main program.

11. The manufacturing method according to claim 7, wherein said step of producing a correction data file comprising the step of setting a predetermined range from a limit value of a design tolerance for each processed part as a correction range and, if said measured result from said measuring device is contained within said correction range, storing an error component relative to a nominal in said correction data file as a correction value.

12. The manufacturing method according to claim 7, wherein said step of producing a correction data file comprising the step of, if an error between said measured result and a nominal is equal to a predetermined multiple of a designated tolerance, storing a value for activating an abnormal process in an alarm variable capable of being referred from said process program and describing said alarm variable in said correction data file.

* * * * *